United States Patent [19]

Young

[11] Patent Number: 4,476,737

[45] Date of Patent: Oct. 16, 1984

[54] ROTARY POWER TRANSMISSION

[75] Inventor: Alastair J. Young, Kenilworth, England

[73] Assignee: Automotive Products plc, Leamington Spa, England

[21] Appl. No.: 417,503

[22] Filed: Sep. 13, 1982

[30] Foreign Application Priority Data

Sep. 19, 1981 [GB] United Kingdom ............... 8128374

[51] Int. Cl.³ .................................................. F16H 3/08
[52] U.S. Cl. .......................................... 74/358; 74/331; 74/333; 74/329
[58] Field of Search ............... 74/329, 331, 333, 357, 74/358

[56] References Cited

U.S. PATENT DOCUMENTS

| 1,759,558 | 5/1930 | Jacobs | 74/359 X |
| 2,466,318 | 4/1949 | Kohr | 74/333 X |
| 2,543,412 | 2/1951 | Kegresse | 74/331 X |
| 2,599,801 | 6/1952 | Youngren et al. | 74/331 X |
| 2,612,787 | 10/1952 | Youngren et al. | 74/331 X |
| 3,691,861 | 9/1972 | Sturmer | 74/330 |

FOREIGN PATENT DOCUMENTS

| 153993 | 1/1938 | Fed. Rep. of Germany | 74/359 |
| 594408 | 12/1947 | United Kingdom | 74/359 |
| 717450 | 10/1954 | United Kingdom | 74/331 |
| 795260 | 5/1958 | United Kingdom | 74/331 |
| 1485940 | 9/1977 | United Kingdom | 74/331 |
| 2064028 | 6/1981 | United Kingdom | 74/329 |
| 680923 | 9/1979 | U.S.S.R. | 74/357 |

*Primary Examiner*—Allan D. Herrmann
*Assistant Examiner*—D. Wright
*Attorney, Agent, or Firm*—Kemon & Estabrook

[57] ABSTRACT

A rotary transmission has an input shaft, an output shaft, two layshafts, two drive clutches and gear trains selectively engageable by dog clutches to transmit drive from the input shaft to the output shaft according to the state of engagement of the drive clutches and dog clutches. A transfer gear train and dog clutch is provided for drive between the layshafts, a further dog clutch being provided between one of the layshafts and the output shaft. The transmission provides six sequential speed ratios with pre-selection of adjacent ratios, alternate speed ratios being driven respectively through one and the other clutch.

7 Claims, 3 Drawing Figures

| SR | CE | SE |
|---|---|---|
| 1 | 12 | S5, S2 |
| 2 | 13 | S6, S2 |
| 3 | 12 | S3 |
| 4 | 13 | S4 |
| 5 | 12 | S5, S1 |
| 6 | 13 | S6, S1 |

ROTARY POWER TRANSMISSION

This invention relates to rotary transmissions of the dual clutch kind by which is meant a transmission having gear trains each being one of a set providing a series of increasing speed ratios, and two clutches independently operable and providing alternative drive paths through the gear trains between a common input and a common output, the gear trains of alternate ratios in the set being driven respectively through one and the other clutch.

The invention is particularly though not exclusively applicable to drive transmissions for motor vehicles.

Examples of transmissions of the dual clutch kind are shown in British Patent Specification Nos. 145,827 (Bramley-Moore), 585,716 (Kegresse), 795,260 (David Brown) and 1,125,267 (Bosch).

Current motor vehicle design trends indicate that an increasing proportion of vehicle production will be front wheel drive. Front wheel drive vehicles usually have the engine, clutch, gearbox and final drive mechanisms assembled as a single power unit; this can reduce material and manufacturing costs.

Many of such front wheel drive vehicles have a transverse engine installation, this can reduce overall vehicle length and so reduce manufacturing costs still further.

Small transverse engined vehicles have little space between the front wheel suspension mechanisms to site the power unit. It has been proposed to place the gearbox beneath the engine but this leads to low ground clearance and/or a high bonnet line with consequent reduced driver visibility. Although small transverse engined vehicles having gearboxes placed alongside the engine are known it is uncommon to find such vehicles fitted with a fully automatic transmission.

Current motor vehicle design trends further indicate an increased number of speed ratios being provided in the transmission for reasons of fuel economy.

The present invention seeks to provide a constant mesh rotary transmission which is suitable for small transverse engined vehicles, which provides a greater number of speed ratios than is usual for such transmissions and which is suitable for adaption to fully automatic control.

According to the invention there is provided a rotary transmission having between an input and an output a set of gear trains each providing one of a series of increasing speed ratios and two independently operable clutches, sequential gear trains in the series being arranged respectively for drive through one and the other clutch, the gear trains being arranged only for drive from an input shaft to one of two parallel layshafts, the layshafts being for continuous direct drive to the output characterised thereby that a transfer gear train is additionally provided for drive between the layshafts, means being provided to disconnect one of said layshafts from continuous direct drive to the output.

Such an arrangement can provide six well-spaced forward speed ratios from a very compact gear set.

Other features of the invention are included in the following description of a preferred embodiment shown, by way of example only, in the accompanying drawings in which.

Figure 1:
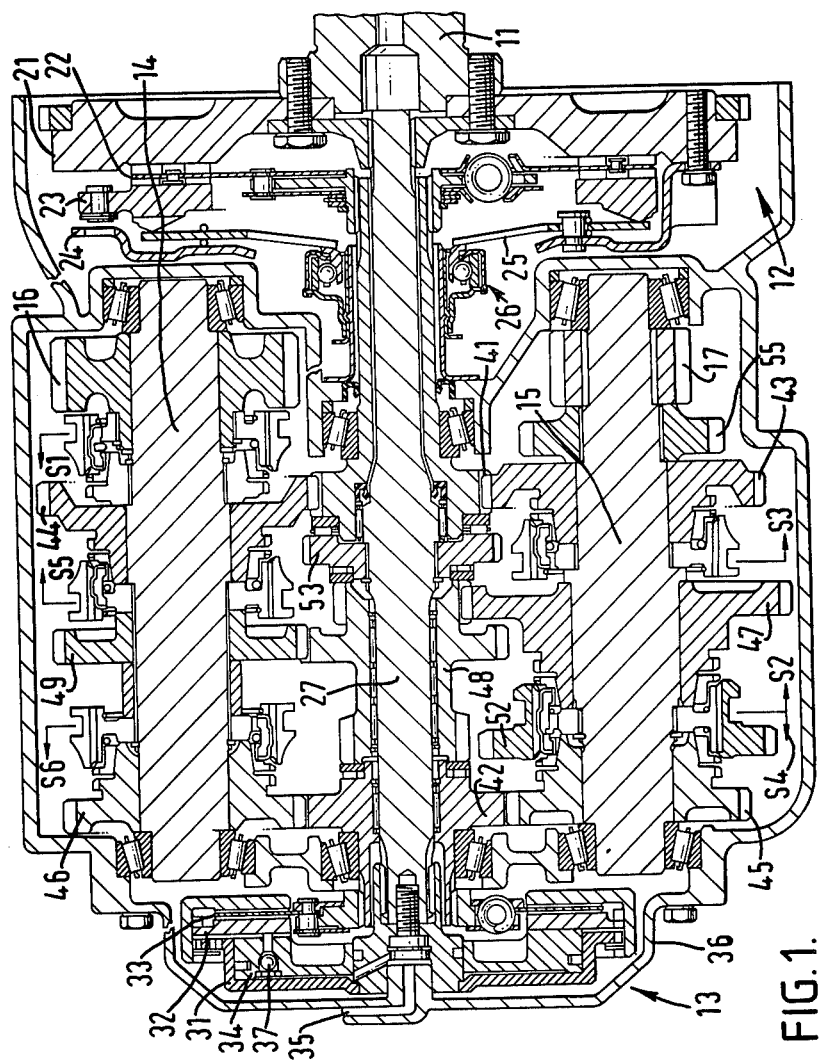
FIG. 1 is an axial section through the transmission but with one of the layshafts positioned out of true position for ease of understanding.

For ease of understanding the transmission is depicted in FIG. 1 as having the three main shafts all lying in the same plane. As will be apparent from the following text and as shown in FIG. 2 one of the shafts may advantageously be out of the plane of the remaining two.

The torque input to the transmission may be direct from an engine or may be through a fluid coupling, for example a hydrodynamic torque converter. The coupling may include a lock-up clutch engageable to directly connect its input and output.

The transmission is intended for fully automatic operation as is described hereinafter.

Figures 2, 3:
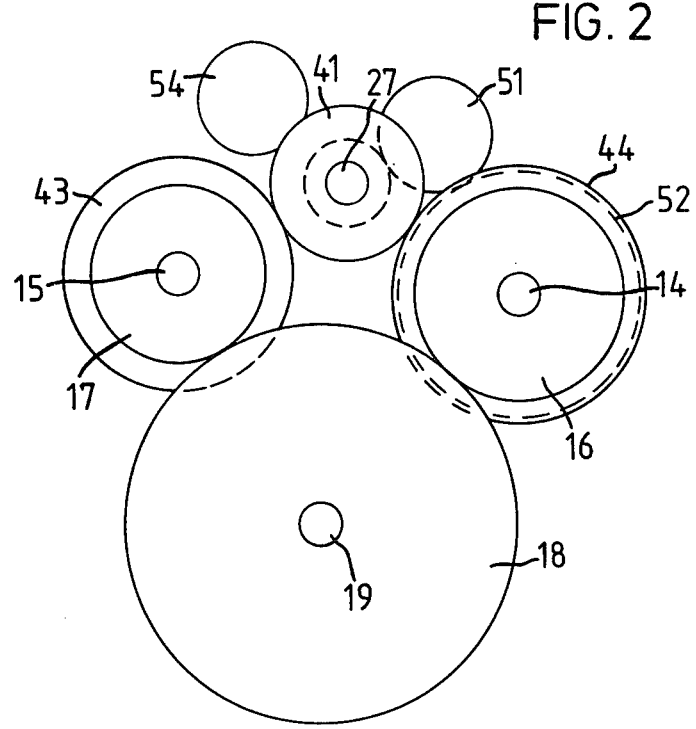
FIG. 2 is a somewhat diagrammatic end view of the transmission and showing certain gear wheels to illustrate their true position with respect to one another.
FIG. 3 is a table showing speed ratio (SR), respective clutch engaged (CE) and respective synchronisers engaged (SE).

With reference to FIGS. 1 and 2 there is shown an input shaft 11 from an engine and connectable through either a clutch 12 or clutch 13 and trains of gear wheels with output shafts 14 and 15 having respective output gear wheels 16 and 17.

The gear wheels 16 and 17 are in mesh with a gear wheel 18 of an output shaft 19 which may part of a differential gear assembly for transmission of driving torque to vehicle wheels. The wheel 16 is journalled on the shaft 14 whilst the wheel 17 is fast for rotation with its shaft 15.

Clutch 12 is preferably a conventional single dry plate clutch having the usual flywheel 21, driven plate 22, pressure plate 23, clutch cover 24 and spring 25. A release bearing 26 is operable to relieve the spring load and thus release the driven plate 22.

A drive shaft 27, fast for rotation with the flywheel 21, extends through the set of gear trains to the opposite side of the transmissions to drive the other clutch.

Clutch 13 is a wet plate clutch having a drive member 31, pressure plate 32 and driven plate 33. A piston 34, housed in the drive member 31 is supplied with fluid under pressure via a duct 35 in a transmission end cover 36.

A pressure relief valve 37, whose function is explained subsequently, is housed in the piston 34. For each clutch driven plate 22,33 an input gear wheel, respectively 41 and 42 is journalled on the drive shaft 27. Each gear wheel 41,42 drives two gear wheels respectively 43,44 and 45,46 journalled on the output shafts 14,15.

A transfer gear train between the output shafts comprises a gear wheel 47 journalled on shaft 15, an idler wheel 48 journalled on the drive shaft 27 intermediate the input gears 41,42, and a wheel 49 fast for rotation with the shaft 14.

The idler wheel 48 has a respective gear profile for engagement with each of the wheels 47,49 in order to provide an even spread of transmission ratios.

A synchroniser and dog clutch assembly S1 is provided to connect output wheel 16 for rotation with shaft 14. Further assemblies S2–S6 are operable to connect the gear wheels 43–47 with the shafts on which they are journalled. Such synchroniser assemblies are of a type found in manual change transmissions and are well understood in the rotary change speed transmission art.

A reverse speed ratio is provided between a gear profile of the idler gear wheel 48, a disengageable idler wheel 51 and a gear profile 52 formed on the double synchroniser assembly S2,S4.

A drive gear wheel 53, for a hydraulic pump 54, is fast for rotation with the drive shaft 27 adjacent the idler wheel 48. The pump provides fluid under pressure for transmission operation, for example engagement of the clutch 13.

A parklock wheel 55 is splined to the output shaft 15 and is engageable with a pawl (not shown) to provide a mechanical lock for the transmission. Such a lock is a usual provision for vehicles fitted with fully automatic transmissions.

Operation of the transmission, with additional reference to FIG. 3 is as follows:

Both clutches 12,13 and synchroniser assemblies S1-S6 are disengaged.

To engage first speed ratio synchroniser assemblies S5 and S2 are engaged. Clutch 12 is gradually engaged to transmit drive from the input shaft 11 through gear wheels 41, 44, 49, 48, 47 to output shaft 15 and hence through gear 17 to the differential gear 18.

Gear wheel 16 is driven by differential gear 18 at all times but is free to turn relative to output shaft 14 by virtue of being journalled thereon.

Second speed may be pre-selected by engagement of synchroniser assembly S6, thus driven plate 33 of clutch 13 is driven idly by output shaft 14 through gear train 46,42.

To effect a speed ratio change from 1st to 2nd clutch 13 is engaged simultaneously with disengagement of clutch 12, drive is now through the gear train 42, 46, 49, 48, 47 with the driven plate 22 of clutch 12 driven idly through train 44,41.

Synchroniser assembly S5 may remain engaged in anticipation of a ratio change back into 1st speed or may be disengaged in preparation for a change to third ratio.

Third speed ratio may be preselected by engagement of synchroniser assembly S3 to idly drive driven plate 22 through gear train 43,41.

A speed ratio change from 2nd to 3rd is effected in the manner of the previous ratio change, by simultaneously disengaging clutch 13 and engaging clutch 12, synchroniser assemblies S6 and S2 then being disengaged in preparation for a further upchange if desired.

To preselect 4th speed ratio synchroniser assembly S4 is engaged, the ratio change being effected by change of drive from clutch 12 to clutch 13, synchroniser assembly S3 being subsequently disengaged.

For 5th speed ratio synchronisers S1 and S5 are engaged to idly drive driven plate 22 from output gear 16. Drive is transferred from clutch 13 to clutch 12 to effect the ratio change.

The ratio change to 6th speed is effected as previously described after preselection engagement of synchroniser assembly S6.

Downchanges through the transmission are effected in the same manner by preselection of the next sequential gear train in the set followed by change of drive from the hitherto engaged clutch to the hitherto disengaged clutch.

The relief valve 37 is to prevent a build up of fluid pressure behind the piston 34 due to centrifugal forces.

The dimensions of the ball and valve bore are carefully chosen to ensure that supply of pressure through duct 35 will force the ball into its seat to close the valve. Release of clutch engaging pressure allows the ball to roll up its seat under centrifugal load to open the valve.

In an alternative arrangement to that shown in FIG. 1 gear wheel 16 is fast for rotation with output shaft 14 whilst synchroniser assemblies S5 and S6 and gear wheels 44 and 49 are mounted on an annular shaft journalled on the output shaft 14. Synchroniser assembly S1 then connects output shaft 14 to the annular shaft. Operation of the transmission is unchanged but the alternative arrangement may be more suitable under different installation conditions.

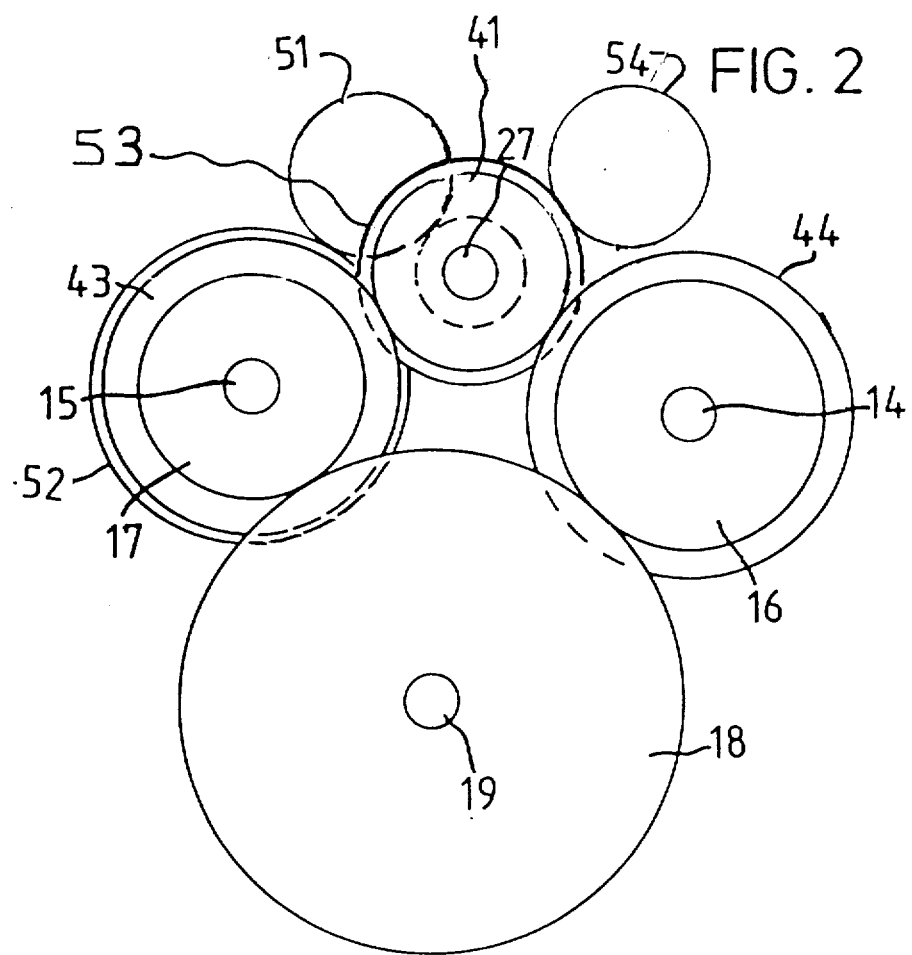

I claim:

1. A rotary power transmission comprising:
   an input shaft;
   an output shaft;
   a first layshaft connected for continuous drive to said output shaft;
   gear trains selectively engageable by dog clutch means between said input shaft and first layshaft;
   a second layshaft connectable by dog clutch means to said output shaft;
   gear trains selectively engageable by dog clutch means between said input shaft and second layshaft;
   a first clutch at one side of the transmission and engageable to establish driving connection between the input shaft and output shaft through one of said gear trains;
   a second clutch at the other side of the transmission and engageable to establish driving connection between the input shaft and output shaft through one other of said gear trains;
   and a transfer gear train provided between said first and second layshafts and comprising:
   a first gear wheel fast for rotation with one of said first and second layshafts;
   a second idler gear wheel;
   and a third gear wheel engageable by dog clutch means with the other of said first and second layshafts.

2. A transmission according to claim 1, wherein said idler gear wheel and input shaft are co-axial.

3. A transmission according to claim 2, wherein said idler gear wheel is journalled on a drive shaft for said second clutch.

4. A transmission according to claim 3, wherein a reversing gear train is provided, said train including said idler gear wheel and one other of said transfer gear train.

5. A transmission according to claim 4, wherein said idler gear wheel has three gear wheel profiles thereon.

6. A transmission according to claim 2, wherein a driven member of said first clutch is one of a three wheel gear train between the layshafts.

7. A transmission according to claim 6, wherein a driven member of said second clutch is one of a three wheel gear train between the layshafts.

* * * * *

UNITED STATES PATENT AND TRADEMARK OFFICE
CERTIFICATE OF CORRECTION

PATENT NO. : 4,476,737

DATED : October 16, 1984

INVENTOR(S) : Alastair J. Young

It is certified that error appears in the above-identified patent and that said Letters Patent is hereby corrected as shown below:

Fig. 2 should be deleted to be replaced with Fig. 2 as shown on the attached sheet.

Signed and Sealed this

Sixteenth Day of July 1985

[SEAL]

Attest:

DONALD J. QUIGG

Attesting Officer     Acting Commissioner of Patents and Trademarks